(12) United States Patent
Bracco

(10) Patent No.: US 10,547,204 B2
(45) Date of Patent: Jan. 28, 2020

(54) ENERGY HARVESTING CIRCUIT WITH AN OSCILLATING STRUCTURE

(71) Applicant: The Swatch Group Research and Development Ltd, Marin (CH)

(72) Inventor: Massimiliano Bracco, Le Landeron (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/134,115

(22) Filed: Sep. 18, 2018

(65) Prior Publication Data
US 2019/0115783 A1 Apr. 18, 2019

(30) Foreign Application Priority Data

Oct. 16, 2017 (EP) ..................................... 17196598

(51) Int. Cl.
*H02J 7/34* (2006.01)
*H02M 3/07* (2006.01)
(Continued)

(52) U.S. Cl.
CPC .............. *H02J 7/345* (2013.01); *H02J 1/102* (2013.01); *H02M 3/07* (2013.01); *H02M 3/156* (2013.01)

(58) Field of Classification Search
CPC .......... H02J 7/345; H02J 1/102; H02M 3/156; H02M 3/07
(Continued)

(56) References Cited

U.S. PATENT DOCUMENTS

| 6,196,371 B1 * | 3/2001 | Martin | ..................... | G07D 3/06 |
| | | | | 194/317 |
| 6,326,772 B2 * | 12/2001 | Kusumoto | ............ | H02M 3/155 |
| | | | | 307/109 |

(Continued)

OTHER PUBLICATIONS

European Search Report dated Mar. 22, 2018 in European application 17196598.1, filed on Oct. 16, 2017.

*Primary Examiner* — M Baye Diao
(74) *Attorney, Agent, or Firm* — Oblon, McClelland, Maier & Neustadt, L.L.P.

(57) ABSTRACT

The present invention relates to an energy harvesting circuit for harvesting energy from at least one energy source. The circuit comprises: an oscillating circuit comprising an inductor and a first capacitor for temporarily storing charges from the energy source and connected in series with the inductor, the inductor being connected to a first oscillating circuit node, while the first capacitor being connected to a second oscillating circuit node; a first switch connected between the first oscillating circuit node and the energy source for selectively connecting and disconnecting the energy source to or from the oscillating circuit; a second switch connected between ground and the first oscillating circuit node for generating a negative voltage across the first capacitor during oscillations of the oscillating circuit for collecting charges from the at least one energy source when the voltage across the first capacitor is negative; a voltage regulating element for controlling voltage across the energy source; a control circuit for controlling opening and closing of the first and second switches; and a clock signal generator for providing a clock signal to the control circuit to allow opening and closing the first and second switches in a timely coordinated manner.

15 Claims, 5 Drawing Sheets

(51) Int. Cl.
*H02M 3/156* (2006.01)
*H02J 1/10* (2006.01)

(58) Field of Classification Search
USPC .......................................................... 320/166
See application file for complete search history.

(56) References Cited

U.S. PATENT DOCUMENTS

| | | | | |
|---|---|---|---|---|
| 6,903,617 | B2* | 6/2005 | Lim | ........................ H01L 23/66 |
| | | | | 331/15 |
| 8,648,664 | B2* | 2/2014 | Eldredge | ............. H01F 27/2804 |
| | | | | 331/117 R |
| 8,665,033 | B2* | 3/2014 | Tang | .................... H03B 5/1228 |
| | | | | 331/117 FE |
| 8,796,903 | B2* | 8/2014 | Furuya | .................... H02P 31/00 |
| | | | | 310/317 |
| 9,281,860 | B2* | 3/2016 | Kawasaki | ................ H04B 1/40 |
| 9,397,613 | B2* | 7/2016 | Babaie | ................ H03B 5/1215 |
| 9,553,545 | B1* | 1/2017 | Khalili | ................... H03B 5/364 |
| 2011/0101789 | A1 | 5/2011 | Salter, Jr. | |
| 2017/0179715 | A1 | 6/2017 | Huang et al. | |
| 2018/0358898 | A1* | 12/2018 | Yamaguchi | ......... H02M 3/1582 |

\* cited by examiner

ENERGY HARVESTING CIRCUIT WITH AN OSCILLATING STRUCTURE

This application claims priority from European patent application No. 17196598.1 filed on Oct. 16, 2017, the entire disclosure of which is hereby incorporated herein by reference.

TECHNICAL FIELD

The present invention relates to an energy harvesting circuit arranged to harvest electrical energy from one or more energy sources. The invention also relates to a method of operating the energy harvesting circuit.

BACKGROUND OF THE INVENTION

The trend towards improved power efficiency in electronic devices has opened the door for energy harvesting solutions, which rely solely on readily available, but often weak sources of energy for powering applications. Energy harvesting brings new challenges for power management, requiring efficient operating characteristics in power management devices, but also in the circuits they control. Through a combination of low power characteristics and effective operating modes, a growing number of semiconductor devices can help designers achieve effective power management in energy harvesting designs. These designs include devices specifically intended for energy harvesting as well as low voltage direct current to direct current (DC-DC) converters intended for low power applications.

Energy harvesting methods have emerged in response to an increasing need for "zero-power" solutions for a growing class of embedded applications for example in automotive, security, medical, and wireless consumer electronics, where battery replacement is difficult, costly, or even hazardous. Energy harvesting designs leverage the ability of transducers to convert light, vibrations, temperature gradients, and radio frequency (RF) energy into useable voltage and/or current but at small levels. By accumulating the microWatts of energy available from ambient energy sources, energy harvesting designs can achieve substantially zero-power operation, i.e. consuming no more than that scavenged from their environment. Power management for energy harvesting applications requires minimum start-up and supply voltage, zero-power standby capability, ultra-low leakage and standby currents, and maximum efficiency while operating with small loads. Ultra-low power DC-DC converters address most or all of these concerns, ensuring stable voltage and smooth current needed for the application.

A DC-DC converter is an electronic circuit or electromechanical device, which is configured to convert a source of direct current (DC) from one voltage level to another. It is a type of electric power converter. Power levels range from very low (small batteries) to very high (high-voltage power transmission). DC-DC converters are typically used in portable electronic devices, such as mobile phones and laptop computers, which are supplied with power from batteries primarily. The electronic devices often contain several sub-circuits, each with its own voltage level requirement different from that supplied by the battery or an external supply (sometimes higher or lower than the supply voltage). Additionally, the battery voltage declines as its stored energy is drained. Switched DC-DC converters offer a method to increase voltage from a partially lowered battery voltage thereby saving space instead of using multiple batteries to accomplish the same thing. However, DC-DC converters or charge pumps, which can be considered to be DC-DC converters that use capacitors for energetic charge storage to raise or lower voltage, are limited by the voltage source from where they extract charges. If the voltage level is too low, the DC-DC current is not enough to charge the supply capacitor. The charge pumps have the same problem. The charge pumps would be limited by the power loss if the voltage level coming from the energy sources is not high enough.

SUMMARY OF THE INVENTION

It is an object of the present invention to overcome at least some of the the problems identified above relating to energy harvesting in electronic devices.

According to a first aspect of the invention, there is provided an energy harvesting circuit for harvesting energy from at least one energy source, the circuit comprising:
- an oscillating circuit comprising an inductor and a first capacitor for temporarily storing charges from the at least one energy source and connected in series with the inductor, the inductor being connected to a first oscillating circuit node, while the first capacitor being connected to a second oscillating circuit node;
- a first switch connected between the first oscillating circuit node and the at least one energy source for selectively connecting and disconnecting the at least one energy source to or from the oscillating circuit;
- a second switch connected between the first oscillating circuit node and a third oscillating circuit node, which is substantially at the lowest electric potential of the energy harvesting circuit, for generating a negative voltage across the first capacitor during oscillations of the oscillating circuit for collecting charges from the at least one energy source when the voltage across the first capacitor is negative;
- a voltage regulating element for controlling voltage across the at least one energy source;
- a control circuit for controlling opening and closing of the first and second switches; and
- a clock signal generator for providing a first clock signal to the control circuit to allow opening and closing the first and second switches in a timely coordinated manner.

The proposed new solution has the advantage that the energy harvesting circuit is not limited by the power of the energy source because the capacitor of the circuit can be charged at a resonant frequency as explained later in more detail. Even if the power of the energy sources is low, it is possible to extract charges or charged particles and store them in the capacitor with low power consumption overhead thanks to the available clock signal generator, which may be a quartz oscillator, which synchronises the actions without a complicated logic circuit or analogic signal processing.

According to a second aspect of the invention, there is provided a method of operating the above energy harvesting circuit, wherein the method comprises closing one of the first switches when the voltage across the first capacitor is substantially at its minimum negative voltage level to connect the energy source to the energy harvesting circuit to allow collecting charges from the energy source, and substantially simultaneously opening the second switch.

Other aspects of the invention are recited in the dependent claims attached hereto.

BRIEF DESCRIPTION OF THE DRAWINGS

Other features and advantages of the invention will become apparent from the following description of a nonlimiting example embodiment, with reference to the appended drawings, in which.

DETAILED DESCRIPTION OF THE INVENTION

Figure 1:
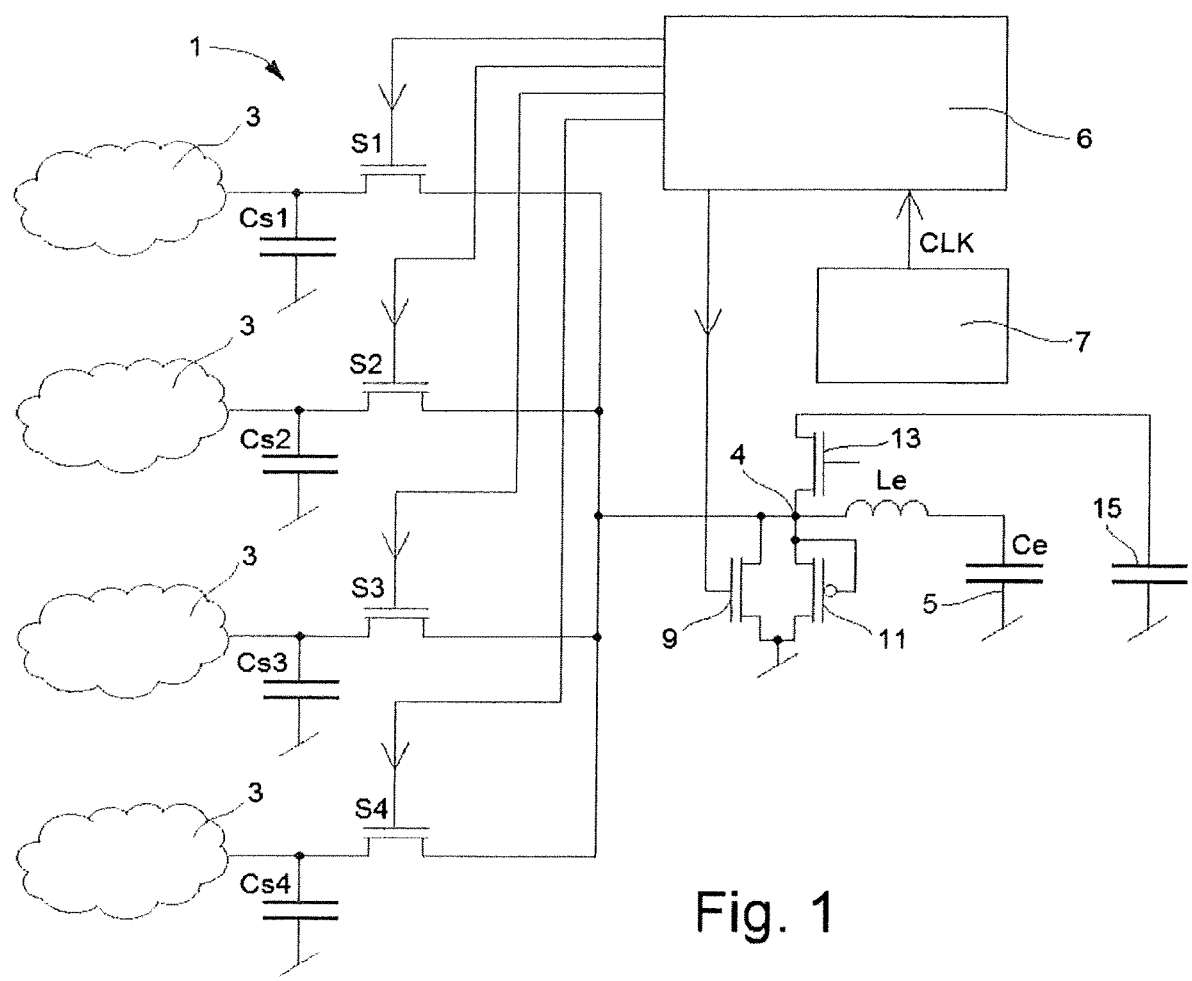
FIG. 1 is a circuit diagram illustrating some elements of the proposed energy harvesting circuit according to one example of the present invention.

An embodiment of the present invention will now be described in detail with reference to the attached figures. The invention will be described in the context of an electronic timepiece, such as a wristwatch. However, the teachings of the invention are not limited to this environment. Identical or corresponding functional and structural elements which appear in different drawings are assigned the same reference numerals.

FIG. 1 illustrates a circuit diagram showing an energy harvesting circuit 1 according to an example of the present invention. In this example, electrical energy can be harvested or scavenged from multiple external energy sources 3. Four energy sources are shown in FIG. 1, namely a solar cell, a thermoelectric generator (TEG), also known as a Seebeck generator, a magnetic induction circuit, a piezoelectric element or a battery. To recover energy from heat, the TEG may be used, which is a solid-state device arranged to convert heat flux (temperature differences) directly into electrical energy through a phenomenon called the Seebeck effect (a form of thermoelectric effect). TEGs generally function like heat engines, but are less bulky and have no moving parts. According to the present invention, the energy harvesting circuit 1 is arranged to collect energy from all the energy sources 3, one by one in the below example, irrespective of their voltage level or current.

The energy harvesting circuit 1 comprises an oscillating circuit comprising an external inductor Le, referred to as a coil, and a first capacitor Ce, referred to as an external capacitor connected in series with the coil Le. The oscillating circuit is connected between a first oscillating circuit node 4 and a second oscillating circuit node 5 connected to ground. In other words, one of the electrodes of the external capacitor Ce is grounded. The first oscillating circuit node 4 is connected through first switches S1, S2, S3, S4 to the energy sources 3 and more specifically to second capacitors, referred to as source capacitors Cs1, Cs2, Cs3, Cs4, which can be considered to be part of the energy sources 3. Thus, at the output of a respective energy source 3, there is provided a respective source capacitor Cs1, Cs2, Cs3, Cs4, whose one of the two electrodes is grounded. In this example, the first switches are transistors, and more specifically n-type metal-oxide-semiconductor field effect transistors (MOSFETs). The operation of these switches is controlled by a control circuit 6, referred to as a logic circuit. More specifically, the logic circuit 6 is configured to adjust the gate voltage of the transistors S1, S2, S3, S4 to adjust the conductivity of the channel between source and drain nodes.

In this manner, the first switches S1, S2, S3, S4 are arranged to be either closed or open. In the present description, when a switch is said to be closed, then the path between the source and drain nodes is electrically conductive, whereas when a switch is said to be open, then this path is not electrically conductive.

The logic circuit 6 receives its timing or clock signal from a clock signal generator 7, which in this example is a quartz oscillator, also known as a crystal oscillator. In other words, the logic circuit 6 is driven by the clock signal provided by the quartz oscillator 7.

It is to be noted that the clock signal generator can be also an RC oscillator or a ring oscillator or a phase locked loop (PLL).

Between the first oscillating circuit node 4 and ground there is provided a second switch 9, which in this example is a transistor, and more specifically an n-type MOSFET. The operation of the second switch 9 is also arranged to be controlled by the logic circuit 6. A voltage regulating element or unit 11 is provided in parallel with the second switch 9. In this example, the voltage regulating element 11 is a diode-connected transistor, which in this example is a p-type MOSFET. The source nodes of these two transistors are grounded while the drain nodes are connected to the first oscillating circuit node 4. The purpose of the voltage regulating element 11 is to control the voltage across the energy sources 3, or more specifically across their source capacitors Cs1, Cs2, Cs3, Cs4. In this manner, any negative voltage across any of the source capacitors Cs1, Cs2, Cs3, Cs4 can be avoided. It is to be noted in the present description when an element is said to be grounded, it could instead be connected to a circuit node which at the lowest electric potential of the circuit. This electric potential is advantageously fixed to a given level.

The example energy harvesting circuit 1 of FIG. 1 further comprises a third switch 13 connected to the first oscillating circuit node 4. In this example, the third switch 13 is a transistor, and more specifically an n-type MOSFET such that the source node of this transistor is connected to the first oscillating circuit node 4. A second capacitor 15, referred to as a supply capacitor, is connected in series between the third switch 13 and ground. The purpose of the supply capacitor 15 is to collect the charges from the external capacitor Ce as explained later in more detail. This kind of configuration ensures an efficient isolation between the capacitances of the external capacitor Ce and the supply capacitor 15 even if a high oscillating voltage across the external capacitor Ce is used to collect small charges from the energy sources 3. With this kind of configuration, where the supply capacitor 15 is connected through the third switch 13 to the first oscillating circuit node 4, the third switch 13 has to deal with zero or relatively low voltages at its source node, which is connected to the first oscillating circuit node 4 (the drain node being connected to the supply capacitor 15).

To summarise, the example energy harvesting circuit 1 features the following characteristics:

The source capacitor Cs1 at the output of the energy source 3.

N-type MOSFET switches S1 and 9 for coil and ground connection.

P-type MOSFET 11 connected in diode mode.

The coil Le and external capacitor Ce for storing energy from every source as shown in FIG. 1.

The coil Le is connected before the external capacitor Ce to avoid the negative voltage across the external capacitor Ce to be also reflected across the second switch 9. Otherwise it would be difficult to isolate the external capacitor Ce.

The following description explains the manner charges can be collected from any one of the energy sources 3. In the energy harvesting circuit 1, the oscillating circuit oscillates substantially at the same frequency as the quartz when the second switch 9 is closed. However, the oscillation frequency may slightly change when the oscillating circuit is connected to any one of the energy sources 3 through the first switches S1, S2, S3, S4. This avoids treating analogue signals to get derivative or integral signals. This further means that the current consumption can be reduced to its minimum, avoiding biasing and amplification stages. When the voltage is at its minimum (negative voltage) across the external capacitor Ce, the second switch 9 is opened and substantially simultaneously one of the first switches S1, S2, S3, S4 is closed so that one of the energy sources 3 is connected through the respective switch S1, S2, S3, S4 to the coil Le, which is ready to extract the charge(s) and store it/them in the external capacitor Ce. In this example, the first switch remains closed until the voltage across the external capacitor Ce reaches its maximum value.

By examining the above operation of the energy harvesting circuit 1, it can be observed that the external capacitance Ce is connected to the source capacitor Cs1, Cs2, Cs3, Cs4 every time the voltage over the external capacitor Ce is at its minimum or below a certain programmed level relevant for recharge. At the same time, the voltage across the coil Le is at its maximum value, and thus even if the source capacitor has only few charges, the harvesting circuit is able to collect these charges.

The proposed solution has a major advantage compared to a DC-DC circuit. If a DC-DC circuit is used instead of the proposed solution and if the source capacitor has only few charges, the current in the external coil could not be enough to store charges in the external capacitor because of the parasitic resistances wasting the low energy in the coil. By contrast, with the proposed solution, the maximum possible voltage difference across the external coil Le is provided, and if it is still not enough, the circuit only needs to wait for the next oscillation cycle where the voltage difference is increased by some other energy sources. In other words, the energy harvesting circuit 1 is configured to collect charges from another energy source after each oscillation cycle if this is deemed beneficial by the logic circuit 6. Compared to charge pumps the advantage is also clear. If charge pumps are used, then the voltage level across the external energy sources could be multiplied by a fixed amount, but not indefinitely because every charge pump stage would introduce additional resistances which waste the power available. With the proposed solution, it is possible to keep the oscillating circuit oscillating until a defined voltage level has been reached before storing the charges in the supply capacitor 15 directly connected to a main supply (not illustrated in the figures).

Figure 2:
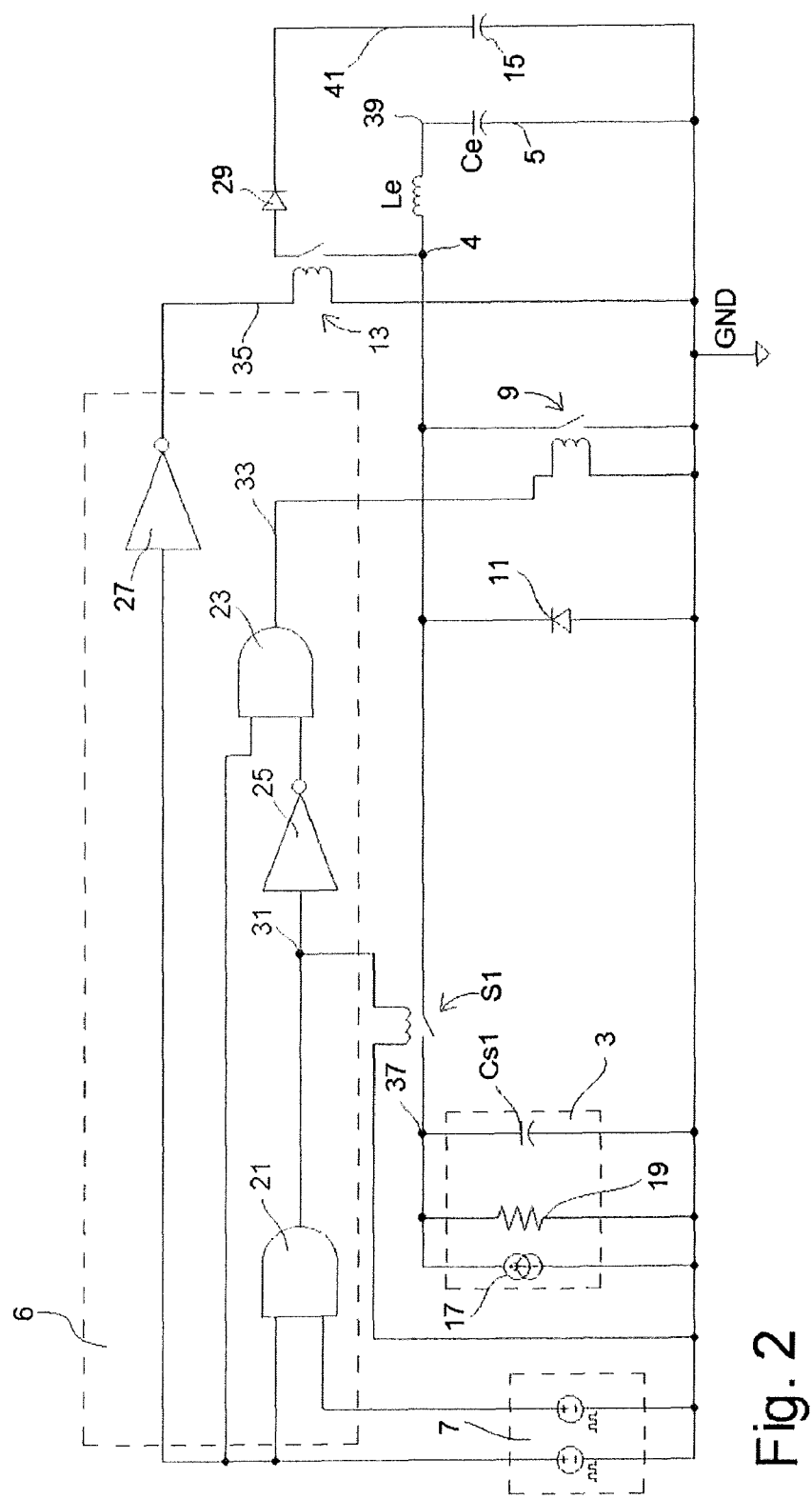
FIG. 2 is a circuit diagram illustrating a simulation configuration of the proposed energy harvesting circuit according to one example of the present invention.

FIG. 2 illustrates a circuit diagram showing an example circuit configuration used in a simulation as explained below. An external energy source 3, in this example a current source, such as a solar cell, is represented by a current source 17, a resistor 19 and one source capacitor Cs1 (all in parallel configuration). The clock signal generator 7 comprises in this example a first voltage source and a second voltage source generating a first clock signal and a second clock signal, respectively. The voltage regulating element 11 is in this example a diode for providing low (negative) voltage protection for the source capacitor Cs1 in case the external energy source 3 is not able to provide enough charges for the coil Le. Logic circuit 6 is a simple one in this example and comprises a first AND gate 21, a second AND gate 23, a first NOT gate 25 and a second NOT gate 27. The logic circuit is used to control opening and closing of the switches of the energy harvesting circuit. No special analogue circuitry is required to compare, derive or integrate complex signals. The external coil Le and the external capacitor Ce oscillate at the quartz frequency with a given fixed oscillation cycle length and charges are transferred at the resonance rate (corresponding to the quartz frequency) to the external capacitor Ce without complex regulating circuitry. The circuit of FIG. 2 further comprises a current regulating element 29, which in this example is a diode 29 connected between the third switch 13 and the supply capacitor 15. Instead of the diode, it would be possible to use a diode-connected transistor, for example. The purpose of this element is to prevent current or charges flowing from the supply capacitor 15 towards the external capacitor Ce.

Figure 3:
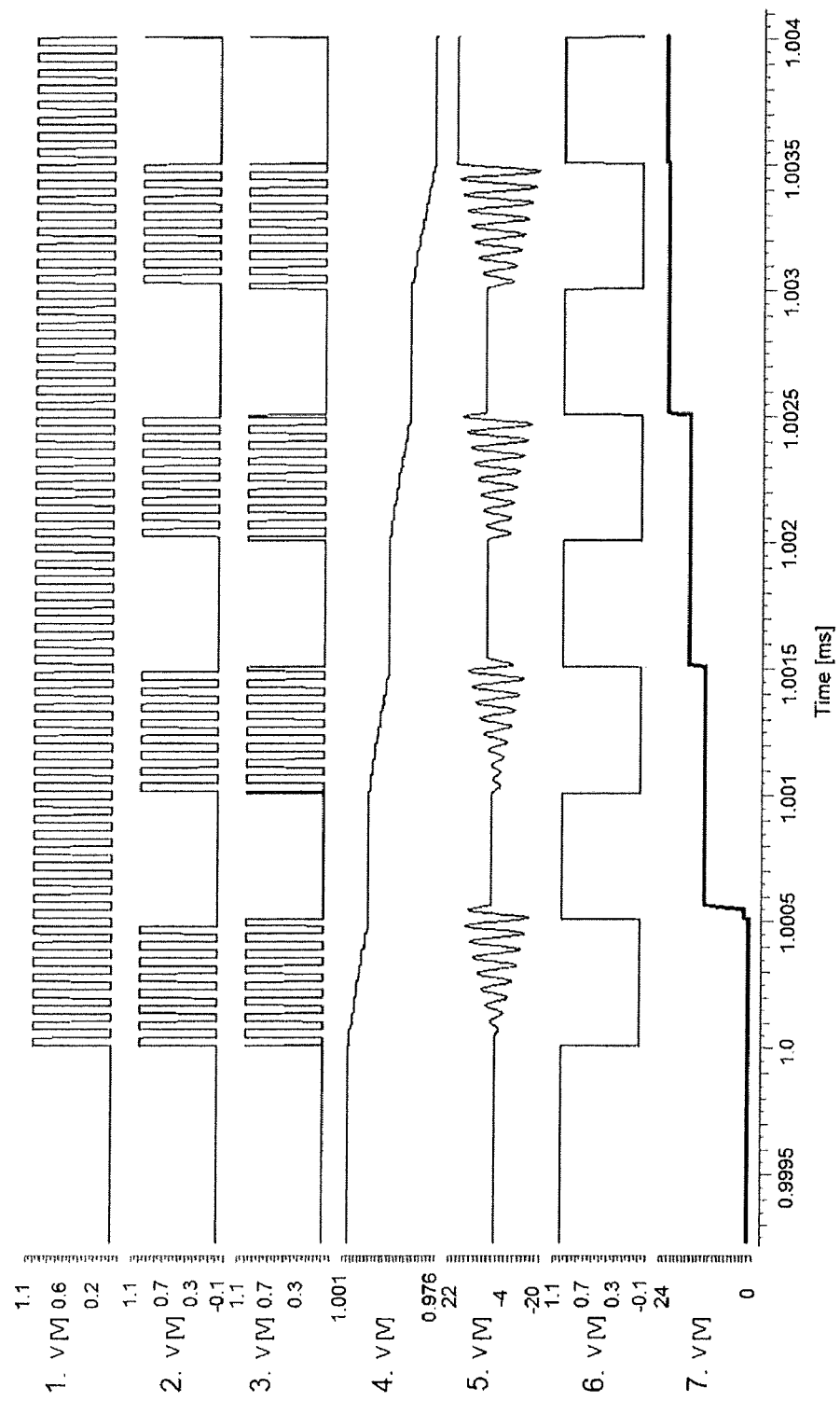
FIG. 3 is a signal diagram illustrating some signal waveforms measured in the circuit of FIG. 2.
Figure 4:
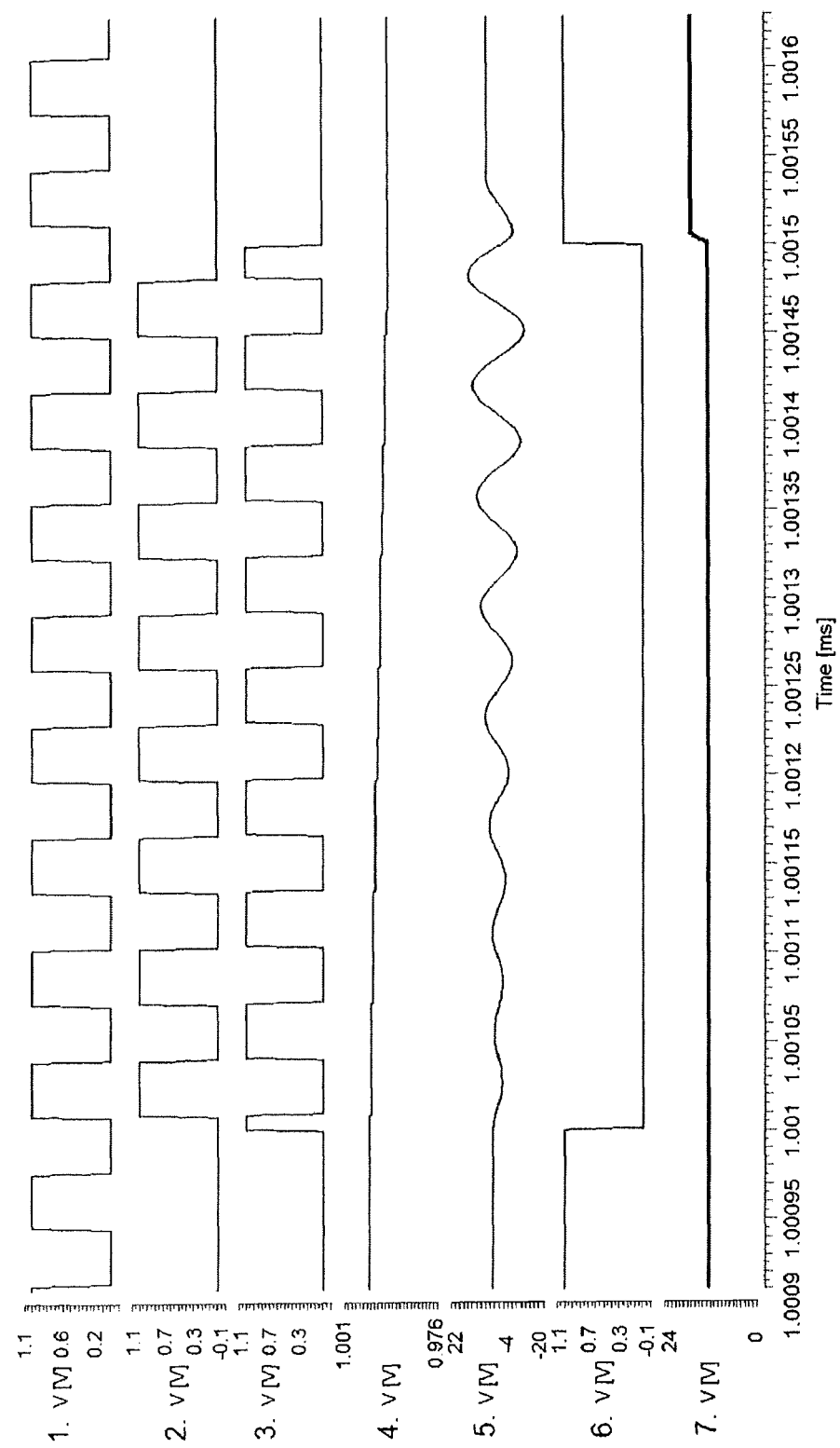
FIG. 4 is a signal diagram illustrating a portion of the signal waveforms shown in FIG. 3 in a more detailed view.

FIG. 3 illustrates some signal waveforms measured in the simulation circuit of FIG. 2, while FIG. 4 illustrates in a close-up view a portion of the signals shown in FIG. 3 in more detail. The first signal waveform from the top (shown as "1." in FIGS. 3 and 4) is the main clock signal (CLK) generated by the clock signal generator 7. In this example, the main clock signal is a square wave. In other words, it is a waveform in which the amplitude alternates at a steady frequency between fixed minimum and maximum values, with the same duration at minimum and maximum. From this clock signal, the logic circuit 6 generates further clock signals, namely the second, third and sixth signals counted from the top. These signals are measured at circuit nodes 31, 33 and 35, respectively, shown in FIG. 2. In this example, the second and third signals have the same frequency as the main clock signal. In FIGS. 3 and 4, the fourth signal from the top shows the voltage value across Cs1 as measured at a node 37. The fifth signal waveform shows how the voltage value across the external capacitor Ce oscillates between a positive value and a negative value as measured at a circuit node 39. In this case, the waveform resembles a sinusoidal waveform but with a constantly increasing amplitude until a certain point in time. The seventh signal waveform shown at the bottom in FIGS. 3 and 4 illustrates how the voltage value across the supply capacitor 15 gradually increases as charges are transferred to it from the external capacitor Ce. This voltage is measured at a circuit node 41.

By examining the signal waveforms of FIGS. 3 and 4, the following observations can be made. The first and second switches S1, 9 are driven by the two opposing clock signals. In other words, when one of the clock signals is at logical one, the other one is at logical zero and vice versa. This means that when the first switch S1 is closed, the second switch 9 is open and vice versa. In this way, the switching of the first and second switches can happen in a synchronous manner. If multiple external energy sources 3 are used, then the second switch 9 is open only when all the first switches S1, S2, S3, S4 are closed. The signal level of the fourth signal decreases gradually as charges are transferred to the external capacitor Ce. The charge transfer takes place when the first switch S1 is closed. The oscillating amplitude of the fifth signal increases over time because of the resonance effect between the coil Le and the quartz clocks, which control the switches and the connection of the coil Le to the external energy source 3. At every oscillation cycle (defined by the time difference between two consecutive equal states of the main clock signal) some charges increase the amplitude of the oscillating signal. The cycle length of the main clock signal (the first signal in FIGS. 3 and 4) is in this example substantially the same as the cycle length of the fifth signal. This can be achieved by for example adjusting the dimensions of the external coil Le and/or the external capacitor Ce to match the main clock signal frequency or the main clock signal frequency may be adjusted to match the resonance frequency of the oscillating circuit. The charges from the external capacitor Ce are transferred to the supply capacitor 15 when the sixth signal rises to a logic one. The seventh signal shows how the voltage across the supply capacitor 15 increases step-wise every time the fifth signal reaches the logic one level.

Figure 5:
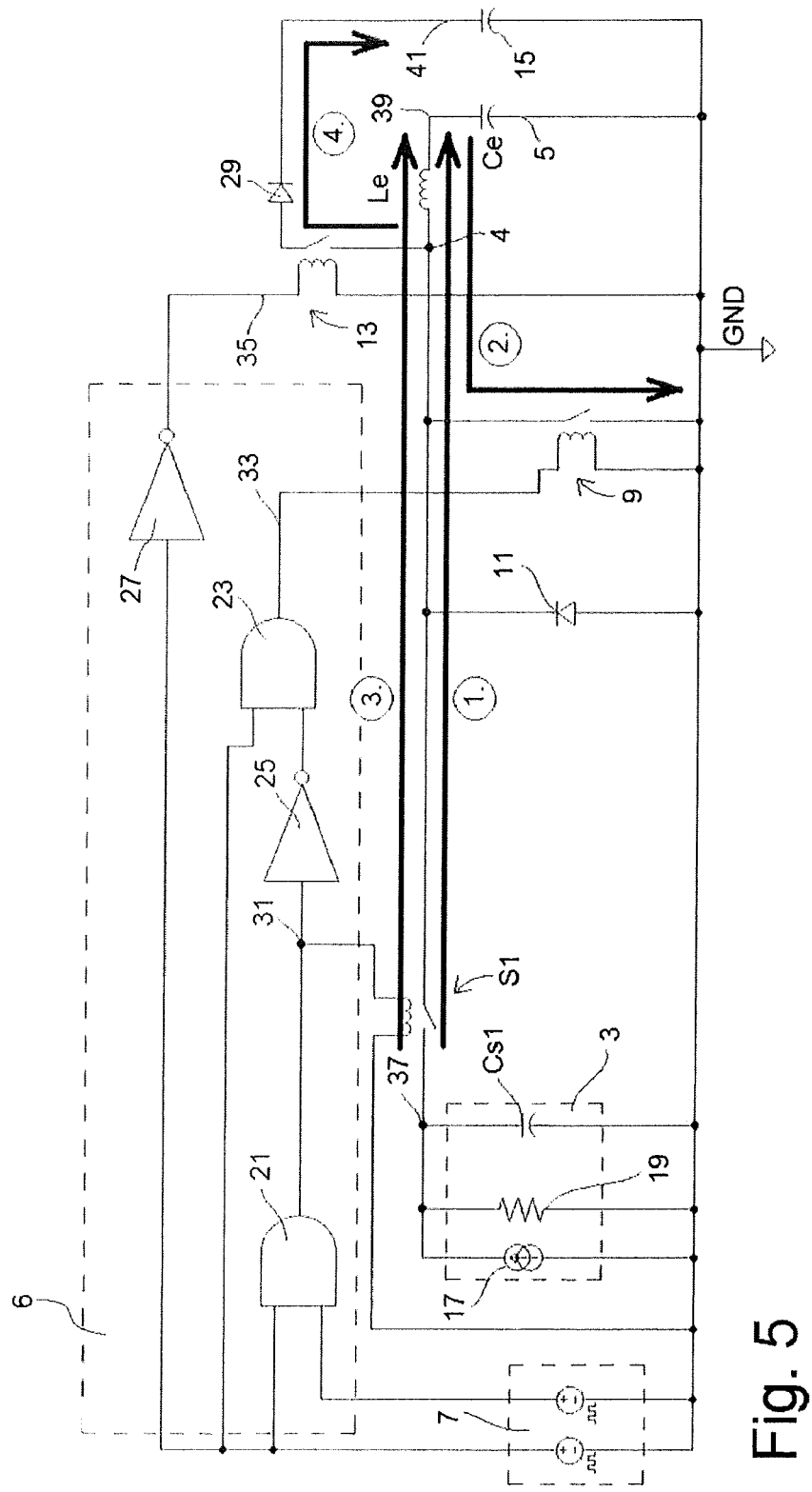
FIG. 5 shows the circuit configuration of FIG. 2 and further illustrates some method steps for operating the energy harvesting circuit.

The process of operating the energy harvesting circuit 1 is next summarised with reference to FIG. 5.

1) Some charges are first transferred to the external capacitor Ce because at start-up, the external energy source 3 charges the empty external capacitor Ce through the coil Le.
2) The logic circuit closes the second switch 9 (unless already closed) and opens the first switch S1. As a consequence, the charges from the external capacitor Ce go to ground charging the magnetic field of the coil Le, which then discharges the external capacitor Ce such that the voltage across the external capacitor Ce becomes negative. In this manner, the external capacitor Ce is always ready to receive other charges from one of the external sources 3 irrespective of the voltage level of the external energy source 3.
3) Next cycle of charging takes place when the logic circuit 6 closes the first switch S1 and opens the second switch 9. During this charging cycle, the external energy source 3 could be the same energy source as in the previous cycle or another energy source, i.e. any one of the energy sources connected to the switches S2, S3 or S4. The selection of the suitable energy source can be made by the logic circuit 6. The selection may be based for instance on the energy levels of the different energy sources 3.
4) Finally, possibly after many charging cycles, the charges are transferred to the supply capacitor 15 and stored there. The voltage level across the supply capacitor is positive and substantially constant, i.e. with no oscillations.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. An energy harvesting circuit for harvesting energy from at least one energy source, the circuit comprising:
   an oscillating circuit comprising an inductor and a first capacitor for temporarily storing charges from the at least one energy source and connected in series with the inductor, the inductor being connected to a first oscillating circuit node, while the first capacitor being connected to a second oscillating circuit node;
   a first switch connected between the first oscillating circuit node and the at least one energy source for selectively connecting and disconnecting the at least one energy source to or from the oscillating circuit;
   a second switch connected between the first oscillating circuit node and a third oscillating circuit node, which is substantially at the lowest electric potential of the energy harvesting circuit, for generating a negative voltage across the first capacitor during oscillations of the oscillating circuit for collecting charges from the at least one energy source when the voltage across the first capacitor is negative;
   a voltage regulating element for controlling voltage across the at least one energy source;
   a control circuit for controlling opening and closing of the first and second switches; and
   a clock signal generator for providing a first clock signal to the control circuit to allow opening and closing the first and second switches in a timely coordinated manner.

2. The energy harvesting circuit according to claim 1, wherein voltage across the first capacitor is arranged to oscillate between a maximum positive voltage value and a negative minimum value such that the oscillation cycle has substantially the same cycle length as the first clock signal.

3. The energy harvesting circuit according to claim 1, wherein the first switch is arranged to be closed when the second switch is open and vice versa.

4. The energy harvesting circuit according to claim 1, wherein the energy harvesting circuit further comprises a second capacitor and a third switch such that the second capacitor is connected to the first oscillating circuit node through the third switch.

5. The energy harvesting circuit according to claim 4, wherein the second capacitor is arranged to be charged with the charges from the first capacitor when the third switch is closed.

6. The energy harvesting circuit according to claim 4, wherein the control circuit is arranged to generate a second clock signal for controlling the operation of the third switch.

7. The energy harvesting circuit according to claim 6, wherein the clock frequency of the second clock signal is different from the clock frequency of the first clock signal.

8. The energy harvesting circuit according to claim 4, wherein the energy harvesting circuit further comprises a current regulating element connected to the third switch for preventing current from flowing from the second capacitor to the first oscillating circuit node.

9. The energy harvesting circuit according to claim 1, wherein the clock signal generator comprises a crystal oscillator comprising a quartz crystal, or an RC oscillator, or a ring oscillator or a phase locked loop.

10. The energy harvesting circuit according to claim 1, wherein the energy harvesting circuit is arranged to harvest energy from multiple energy sources such that the energy harvesting circuit comprises a set of first switches between the multiple energy sources and the oscillating circuit.

11. The energy harvesting circuit according to claim 10, wherein the control circuit is arranged to control the operation of the set of first switches such that only one energy source is connected to the oscillating circuit at a time.

12. The energy harvesting circuit according to claim 1, wherein the first and second switches are n-type MOSFETs.

13. The energy harvesting circuit according to claim 1, wherein the at least one energy source is any one of the following: a solar cell, a thermoelectric generator, a magnetic induction circuit, a piezoelectric element or a battery.

14. A watch comprising the energy harvesting circuit according to claim 1.

15. A method of operating the energy harvesting circuit according to claim 1, wherein the method comprises closing one of the first switches when the voltage across the first capacitor is substantially at its minimum negative voltage level to connect the energy source to the energy harvesting circuit to allow collecting charges from the energy source, and substantially simultaneously opening the second switch.

* * * * *